United States Patent
Peters et al.

(10) Patent No.: US 7,571,963 B2
(45) Date of Patent: Aug. 11, 2009

(54) FITTING FOR A VEHICLE SEAT

(75) Inventors: Christoph Peters, Wermelskirchen (DE); Ulrich Lehmann, Alfter (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 12/077,558

(22) Filed: Mar. 20, 2008

(65) Prior Publication Data

US 2008/0185892 A1 Aug. 7, 2008

Related U.S. Application Data

(63) Continuation of application No. PCT/EP2006/007072, filed on Jul. 19, 2006.

(30) Foreign Application Priority Data

Sep. 30, 2005 (DE) .................. 10 2005 046 807

(51) Int. Cl.
*B60N 2/235* (2006.01)
(52) U.S. Cl. .................. 297/367; 267/156
(58) Field of Classification Search ........... 297/361.1, 297/362, 366, 367; 267/154, 156, 157
See application file for complete search history.

(56) References Cited

U.S. PATENT DOCUMENTS

| | | | |
|---|---|---|---|
| 4,143,905 A | 3/1979 | Hensel et al. | |
| 5,590,931 A | 1/1997 | Fourrey et al. | |
| 5,769,494 A | 6/1998 | Barrere et al. | |
| 6,112,370 A | 9/2000 | Blanchard et al. | |
| 6,149,235 A | 11/2000 | Fahim | |
| 6,312,053 B1* | 11/2001 | Magyar | 297/367 |
| 6,629,733 B2 | 10/2003 | Matsuura et al. | |
| 6,652,031 B2* | 11/2003 | Villarroel et al. | 297/367 |

(Continued)

FOREIGN PATENT DOCUMENTS

DE 102 53 054 A1 6/2004

(Continued)

OTHER PUBLICATIONS

U.S. Appl. No. 12/077,542, filed Mar. 20, 2008; In re: Christoph Peters, entitled Fitting for a Vehicle Seat.

*Primary Examiner*—David Dunn
*Assistant Examiner*—Patrick Lynch
(74) *Attorney, Agent, or Firm*—Womble Carlyle Sandridge & Rice, PLLC

(57) ABSTRACT

The invention relates to a fitting for a vehicle seat, in particular a motor vehicle seat, comprising a first fitting part; a second fitting part which can be rotated about an axis in relation to the first fitting part; an eccentric which is rotationally mounted about the axis and which can be driven; at least two locking devices, which are guided in a radial direction by the first fitting part, can be displaced in a radial direction in an outward manner by the eccentric and which co-operate in a radial manner towards the outside with the second fitting part in order to lock the fitting; and at least one spring arrangement (17) which impinges upon the eccentric. The spring arrangement (17) comprises two springs (27, 28) which are arranged in a central manner and are placed within each other.

22 Claims, 3 Drawing Sheets

U.S. PATENT DOCUMENTS

| | | |
|---|---|---|
| 6,880,887 B2 * | 4/2005 | Hoshihara et al. ........... 297/367 |
| 6,908,156 B1 | 6/2005 | Park et al. |
| 6,991,294 B2 | 1/2006 | Choi |
| 6,991,295 B2 | 1/2006 | Peters |
| 7,404,604 B2 * | 7/2008 | Nag et al. ................... 297/367 |
| 2002/0096922 A1 * | 7/2002 | Villaroel et al. ............. 297/366 |
| 2003/0025377 A1 | 2/2003 | Peters |
| 2003/0173810 A1 * | 9/2003 | Lee et al. .................... 297/367 |
| 2004/0195889 A1 * | 10/2004 | Secord ........................ 297/362 |
| 2005/0052063 A1 | 3/2005 | Volker et al. |
| 2005/0127732 A1 | 6/2005 | Peters |
| 2006/0170269 A1 * | 8/2006 | Oki ............................ 297/367 |
| 2006/0261657 A1 * | 11/2006 | Luo et al. ................... 297/367 |
| 2007/0137393 A1 | 6/2007 | Peters |

FOREIGN PATENT DOCUMENTS

| | | |
|---|---|---|
| EP | 1 225 086 A1 | 7/2002 |
| JP | 60-135338 | 7/1985 |
| JP | 2002-101997 | 4/2002 |
| WO | WO 02/058958 A1 | 8/2002 |
| WO | WO 2004/043733 A1 | 5/2004 |
| WO | WO 2005/023580 A1 | 3/2005 |

* cited by examiner

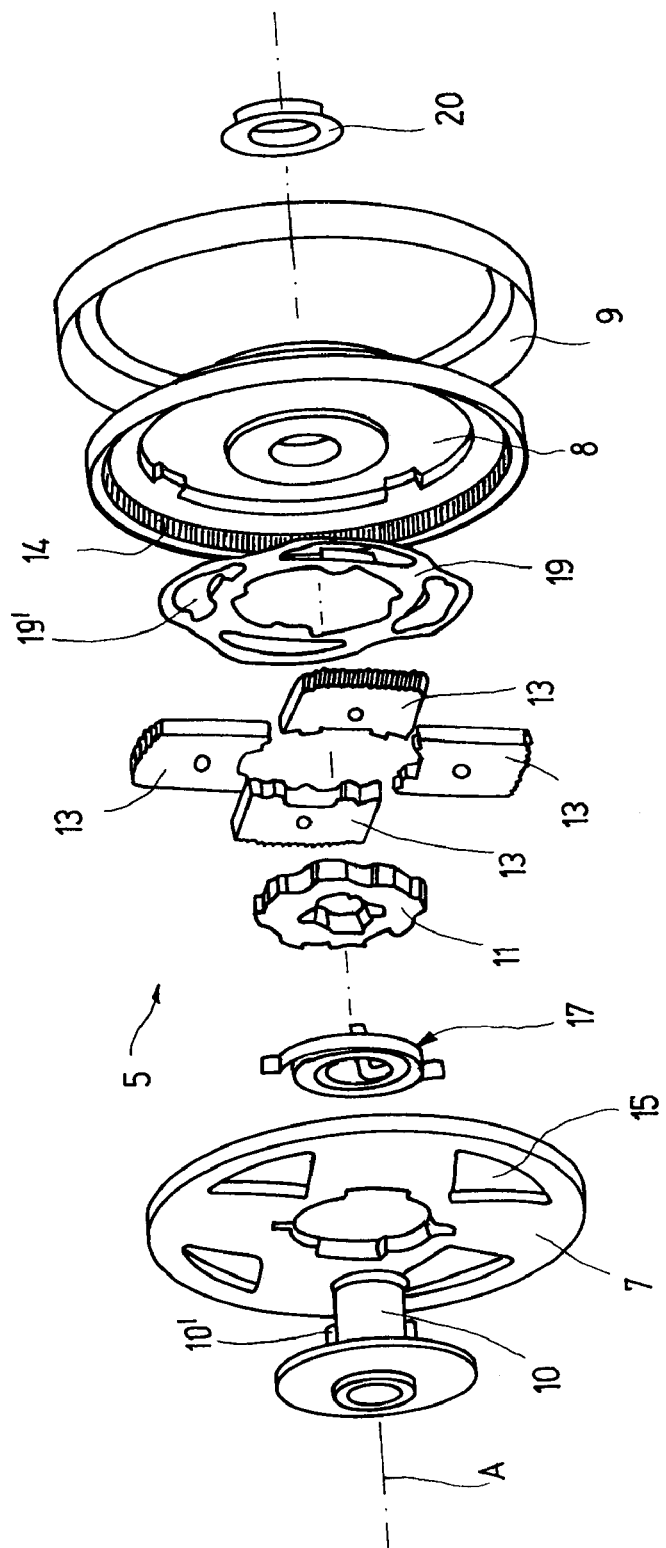
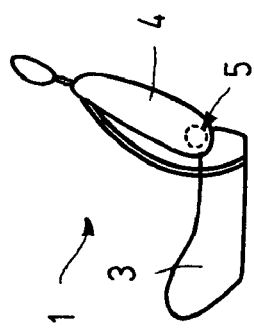
Fig.1
Fig.2

FITTING FOR A VEHICLE SEAT

CROSS-REFERENCE TO RELATED APPLICATION

The present application is a continuation of International Application PCT/EP2006/007072, which was filed Jul. 19, 2006. The entire disclosure of International Application PCT/EP2006/007072, which was filed Jul. 19, 2006, is incorporated herein by reference.

TECHNICAL FIELD

The present invention relates to a fitting for a vehicle seat, in particular a motor vehicle seat, with the fitting having a first fitting part; a second fitting part that can be rotated about an axis relative to the first fitting part; a drivable eccentric that is mounted for rotating about the axis; at least two locking elements that are guided in the radial direction with respect to the axis by the first fitting part, can be moved radially outward under the action of the eccentric, and interact radially outward with the second fitting part in order to lock the fitting; and at least one spring arrangement for acting upon the eccentric.

BACKGROUND OF THE INVENTION

DE 102 53 054 A1 (which is a member of the same patent family as U.S. Pat. No. 6,991,295) discloses a fitting of the type described in the above Technical Field section of this disclosure. DE 102 53 054 A1 discloses a fitting in which the eccentric is acted upon symmetrically and hence in a manner free from transverse force by two radially opposite spring arrangements, in order for the eccentric to act upon the two locking elements when locking the fitting. The spring arrangements are offset with respect to the axis of the fitting by 90° with respect to the locking elements. The spring arrangements and the locking elements are in the same plane.

BRIEF SUMMARY OF SOME ASPECTS OF THE INVENTION

One aspect of the present invention is the provision of improvements to a fitting of the type mentioned above. In accordance with one aspect of the present invention, a fitting for a vehicle seat, in particular a motor vehicle seat, includes first and second fitting parts mounted so that there can be relative rotation, about an axis, between the first and second fitting parts; an eccentric mounted for being rotated about the axis; at least two locking elements that are guided by the first fitting part for moving radially outward, with respect to the axis, in response to rotation of the eccentric, so that the locking elements interact with the second fitting part in order to lock the fitting while the locking elements are positioned radially outwardly; and at least one spring arrangement for acting upon the eccentric, wherein the spring arrangement includes springs, and the springs are centrally arranged and nested one inside the other.

Because the (e.g., single) spring arrangement has two springs which are centrally arranged and nested one inside the other, firstly, because of the nested arrangement, a symmetrical action of the spring arrangement on the eccentric can be achieved, which action is without transverse forces. This action, which is free from transverse force, on the eccentric prevents the eccentric from being laterally displaced out of its predetermined position by transverse forces and therefore carrying out its task less well. Secondly, the central arrangement means that the construction space between the locking elements is available for other components, for example for further locking elements. With this increased number of locking elements, the fitting can be designed as a high-load fitting and can be used for belt-integral seats, which increases the versatility of the fitting.

In order to take up as little construction space as possible, the spring arrangement is preferably arranged in a central cutout of the first fitting part, with it being possible for the cutout (e.g., opening) to be a continuous opening or a depression which is closed on one side. In order to provide sufficient space for the eccentric, the spring arrangement is preferably arranged in a plane offset axially with respect to the eccentric, which can be achieved in a simple manner by a planar design of the first fitting part in the region of the cutout.

The two springs are preferably arranged around the axis and are preferably offset with respect to the axis by 180° with respect to each other, which in each case structurally simplifies the symmetrical action upon the eccentric. In the preferred spiral design of the two springs, which saves construction space, each spring has an outer and an inner spring end. The two springs are supported on the first fitting part preferably by their outer spring ends, which, in particular in the case of the first fitting part having the cutout, can easily be realized by radial grooves or the like. Correspondingly, the two springs act upon the eccentric preferably with their inner spring ends. In the case of the preferred arrangement in a plane offset axially with respect to the eccentric, the inner spring ends can be designed as axially protruding end fingers which engage in the eccentric, or, conversely, the eccentric can have axially protruding projections which are engaged around by the inner spring ends, which are then preferably designed as hooks.

The fitting according to the invention is preferably used in a vehicle seat to attach the backrest to the seat part and to set the inclination of the backrest, but it could also be used in some other way in a vehicle seat.

Other aspects and advantages of the present invention will become apparent from the following.

BRIEF DESCRIPTION OF THE DRAWINGS

The invention is explained in more detail below with reference to an exemplary embodiment illustrated in the drawings, together with a modification that is also illustrated in the drawings. In the drawings:

FIG. 1 shows an exploded illustration of the exemplary embodiment,

FIG. 2 shows a schematic illustration of a vehicle seat,

DETAILED DESCRIPTION

Figure 3:
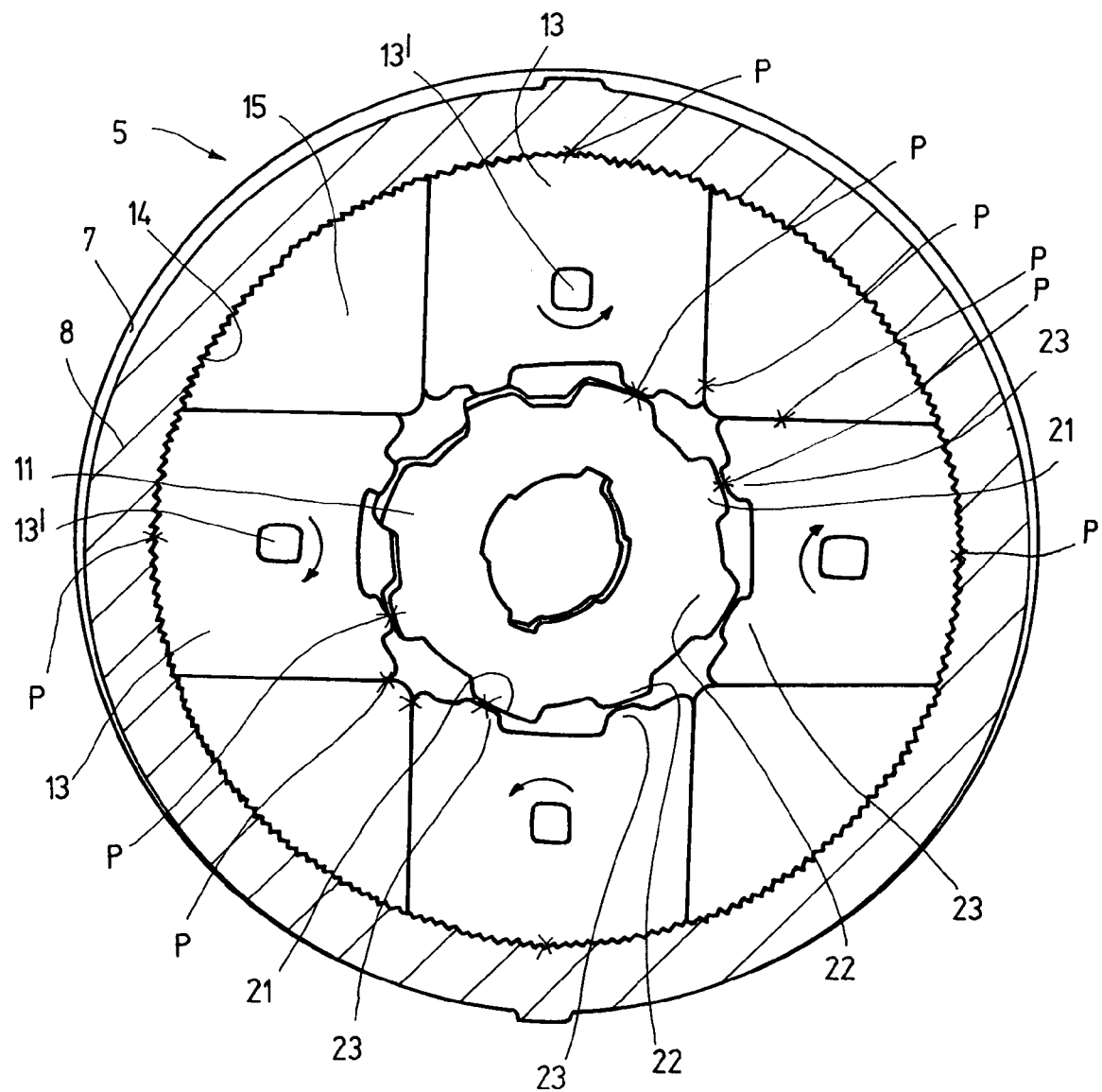
FIG. 3 shows a slightly perspectively illustrated section through the exemplary embodiment in a plane between the locking elements and the control disk.
Figure 4:
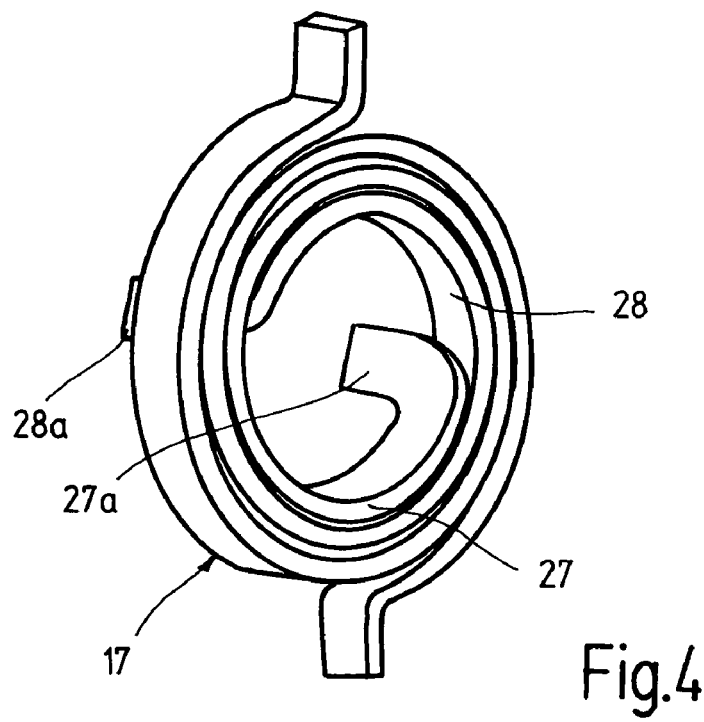
FIG. 4 shows a perspective view of the spring arrangement of the exemplary embodiment.
Figures 5, 6:
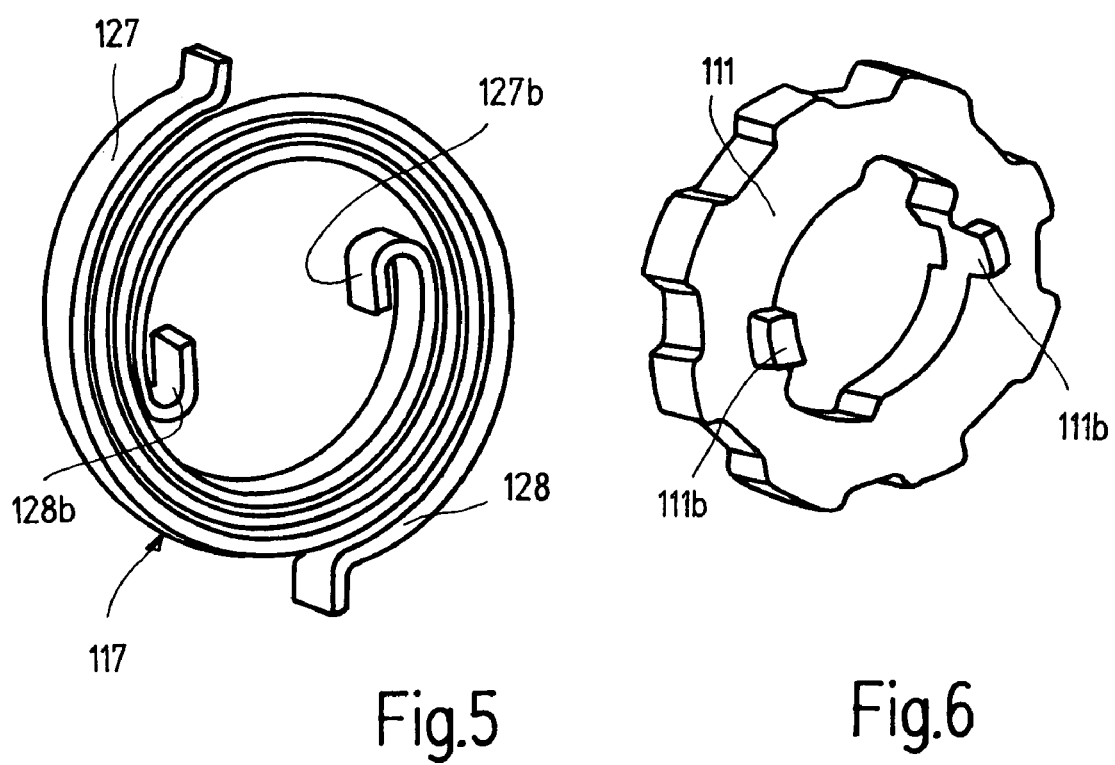
FIG. 5 shows a perspective view of the spring arrangement of the modification.
FIG. 6 shows a perspective view of the eccentric of the modification.

A vehicle seat 1 of a motor vehicle has a seat part 3 and a backrest 4. The backrest 4 is laterally attached to the seat part 3 by way of two fittings, so that the backrest 4 can be pivoted (e.g., inclined) relative to the seat part 3 and can be locked at different settings of the inclination. The orientation of the vehicle seat 1 in the motor vehicle and its customary direction of travel define the directional details used in this detailed description. The vehicle seat 1 is designed as a seat with an integral seat belt (i.e. the upper end of a seatbelt is fastened to the backrest 4, more specifically to an automatic belt device on the upper edge of the backrest 4). The forces introduced into the backrest 4 via the seatbelt in the event of loading can therefore be conducted on into the seat part 3 via the fittings, which is why at least the fitting 5 on the side of the vehicle seat which is subjected to a higher load and to which the seatbelt is attached is designed as a high-load fitting.

The fitting 5 is based on the same general principle as the fitting described in DE 102 53 054 A1 (which is a member of the same patent family as U.S. Pat. No. 6,991,295), the entire disclosure of which is expressly incorporated herein by reference. The fitting 5 is designed as a latching fitting in disk form. The fitting 5 has a first fitting part 7 and a second fitting part 8 which can be rotated about an axis A relative to the first fitting part 7. The fitting parts 7 and 8 define a construction space that is between the fitting parts 7 and 8. A clasping ring 9 annularly reaches over and engages the second fitting part 8 and is connected to the first fitting part 7, as a result of which the two fitting parts 7 and 8 are held together axially. In the exemplary embodiment, the first fitting part 7 is connected to the seat part 3, and the second fitting part 8 is connected to the backrest 4. However, the converse arrangement is also possible.

A driver 10 is arranged in the center of the fitting 5. The driver 10 is mounted on the second fitting part 8 in a manner such that the driver 10 is rotatable about the axis A that is arranged in the center of the fitting 5. An eccentric 11 that is arranged in the construction space is seated in a rotationally fixed manner on the driver 10, or the eccentric 11 is at least coupled to the driver 10 for being carried along by the driver. The eccentric 11 acts on four identical locking elements 13 that are arranged in the construction space around the eccentric 11. The locking elements 13 are offset by 90° with respect to one another. Each of the locking elements 13 is provided, on its radially outer side (with respect to the axis A), with a toothing in order to interact with a toothed ring 14 of the second fitting part 8, which is designed as an internal gearwheel. The locking elements 13 are guided in the radial direction by guide segments 15 of the first fitting part 7. The toothed ring 14 of the second fitting part 8 rests upon the four guide segments 15, as a result of which the second fitting part 8 is mounted on the first fitting part 7.

A spring arrangement 17 (described more specifically below) is arranged in a central opening (e.g., cutout) of the first fitting part 7 and acts upon the eccentric 11 such that the eccentric 11 presses the locking elements 13 radially outward, i.e. into the toothed ring 14; therefore, the fitting 5 is locked. A control disk 19 is arranged in the construction space axially between the locking elements 13 and the second fitting part 8. In the exemplary embodiment, the control disk 19 is seated in a rotationally fixed manner on the eccentric 11. The control disk 19 has four slotted guides 19', each of which interacts with a lug 13' of a respective one of the locking elements 13. The lugs 13' protrude in the axial direction from the locking elements 13. When the driver 10—and therefore the eccentric 11 and the control disk 19 driven thereby—is rotated counter to the force of the spring arrangement 17, the control disk 19 pulls the locking elements 13 radially inward, i.e. out of engagement with the toothed ring 14, and therefore the fitting 5 is unlocked.

The driver 10 is mounted in an opening of the second fitting part 8, with the driver 10 being mounted by way of a hub. Two integrally formed ribs 10' of the driver 10 bear in the axial direction against the inside of the second fitting part 8. A securing ring 20, which is arranged on the outside of the second fitting part 8, is fixedly seated on the hub of the driver 10. The securing ring 20 is clipped onto the hub of the driver 10 during assembly of the fitting 5, so that the driver 10 is axially secured.

During proper use, i.e. normally, a play necessary for the operation of the fitting 5 could lead to noise being generated. Therefore, provisions are made so that, when the fitting 5 is locked, the locking elements 13 can tilt—laterally with respect to the radial direction—even in the normal situation in order to compensate for the play (in particular in the circumferential direction). For this purpose, first eccentric cams 21 and second eccentric cams 22 are formed on the eccentric 11. The first eccentric cams 21 protrude radially somewhat over (e.g., radially farther outward than) the second eccentric cams 22. The four first eccentric cams 21 and the four second eccentric cams 22 form four pairs. As viewed in the circumferential direction of the eccentric 11, the sequence of the cams 21, 22 within a pair changes from pair to pair, i.e. two mutually adjacent first eccentric cams 21 are followed by two mutually adjacent second eccentric cams 22, and vice versa. Each pair is assigned precisely one locking element 13. Two locking cams 23—preferably of identical design—are arranged on each locking element 13, on the side facing the eccentric 11 and offset with respect to the radial center line of the locking element 13. For each of the locking elements 13, one of the locking cams 23 is aligned with a first eccentric cam 21, and the other locking cam 23 is assigned to a second eccentric cam 22.

When the eccentric 11 acts upon the locking elements 13, this normally means that only the first eccentric cam 21 in each case acts upon the locking cam 23 assigned to it, and therefore the locking element 13 moves radially outward while there is a gap between the second eccentric cam 22 in each case and the locking cam 23 assigned to it. As soon as the locking element 13 engages in the toothed ring 14, the locking element 13 tilts, i.e. rotates somewhat, in a direction indicated by a curved arrow in FIG. 3, until the play is compensated for. The locking element 13 then acts as a diagonal strut and is in contact at three points P with in each case one other component of the fitting 5, namely with the assigned first eccentric cam 21, i.e. the eccentric 11, the nearest adjacent guide segment 15, i.e. the first fitting part 7, and the toothed ring 14, i.e. the second fitting part 8. Because of the alternating sequence in the pairs of eccentric cams 21 and 22, the locking elements 13 tilt in an alternating direction, i.e. in each case in opposite directions to their respective neighbors. In each case, two mutually opposite locking elements 13 therefore tilt in the same direction which is in the opposite direction to that of the other two locking elements 13.

If a force is now exerted on the backrest 4, for example via the seatbelt, and in particular in the event of a crash, the second fitting part 8 experiences a torque. As a result, the second fitting part 8 exerts, by way of the toothed ring 14, a force in the circumferential direction on the four locking elements 13. For two locking elements 13, this force, i.e. load, acts in the direction in which they are tilted, and they therefore, firstly, can immediately conduct the force on and, secondly—if appropriate under elastic and/or plastic deformation—tilt somewhat further until the respective locking cam 23, which has been free up to now, comes into contact with the second eccentric cam 22, i.e. there is no longer a gap. However, the small movement of the locking elements 13 leads to slightly reduced strength. Upon a further increase in force, the force is now essentially conducted onto the eccentric 11 via the locking cam 23 which was free up to now. For the two other locking elements 13, the force, i.e. load, acts counter to the direction in which they are tilted. These two locking elements 13 therefore tilt counter to the original tilting direction and, in the process, conduct the force directly into the eccentric 11 via the respective first eccentric cam 21. In this case, these two locking elements 13 oppose the load with increased strength.

Because of the tilting normally of the locking elements 13 in the opposite direction, the same situation arises for a head-on crash and rear crash, i.e. the force flux passes in each case through a pair of locking elements 13 with two supported locking cams 23 (and, in the process, primarily via the previously free locking cam 23) and through a pair of locking elements, in which (furthermore) only one locking cam 23 is supported. The strength therefore significantly increases in total over an arrangement with just two locking elements, but also over an arrangement in which all of the locking elements tilt in the same direction, and therefore a loading direction would be opposed by lower strength.

For construction-space reasons, the spring arrangement 17 is arranged centrally in the first fitting part 7. If the spring arrangement 17 were to act on the eccentric 11 on one side, transverse forces would arise which would bring the eccentric 11 from its centered position into an asymmetrical position, which would cause a deterioration in its operation. In order to avoid this, the spring arrangement 17 comprises a first spring 27 and a second spring 28 which are each designed per se as a flat spiral spring. The two springs 27 and 28 are arranged rotated (e.g., rotationally offset) with respect to each other by 180° around the axis A and are nested one inside the other, i.e. the distances between the respective coils are selected to be of a size sufficient that a coil of the second spring 28 comes to lie between two coils of the first spring 27, and a coil of the first spring 28 comes to lie between two coils of the second spring 28, and there is also sufficient spring deflection in each case for contraction or expansion.

The two springs 27 and 28 are supported on the first fitting part 7 by way of their outer spring ends. The outer spring ends of the springs 27, 28 are angled radially and engage in a form-fitting manner in corresponding radial grooves of the central opening of the first fitting part 7. The radial grooves of the central opening of the first fitting part 7 are positioned radially opposite from one another. The action upon the eccentric 11 by the springs 27 and 28 takes place by way of the respective inner spring ends. In accordance with the exemplary embodiment, the inner spring ends are referred to, for the first spring 27, as first end finger 27a, and, for the second spring 28, as second end finger 28a. The two end fingers 27a and 28a are angled axially, since the eccentric 11 is arranged in an axially offset plane from the coils of the springs 27, 28. Also, the two end fingers 27a and 28a are arranged radially opposite each other. The end fingers 27a and 28a engage in correspondingly shaped, lateral cutouts of a central opening of the eccentric 11. The central opening of the eccentric 11 receives the driver 10, and the end fingers 27a and 28a end between the driver 10 and the eccentric 11. The symmetrical arrangement, supporting and acting upon the two springs 27 and 28 causes the transverse forces to be eliminated, and therefore the eccentric 11 as a whole is acted upon in a manner free from transverse force.

In a modification of the exemplary embodiment, a spring arrangement 117 has a first spring 127 and a second spring 128 which are likewise (i.e., in the same manner discussed above) nested one inside the other, but, instead of having end fingers, the first and second springs 127, 128 respectively have a first hook 127b and a second hook 128b, which are each curved radially inward. For action upon the eccentric 111, axially protruding fingers 111b are provided on the eccentric 111, and the two hooks 127b and 128b respectively engage around the fingers 111b. In all other features, the modification corresponds to the exemplary embodiment.

The springs 17 and 18 or 117 and 118 are also to be considered to be nested one inside the other if merely projections (of the springs) overlap one another in a plane that extends perpendicularly with respect to the axial direction, while the springs are arranged axially offset with respect to one another.

It will be understood by those skilled in the art that while the present invention has been discussed above primarily with reference to an exemplary embodiment, various additions, modifications and changes can be made thereto without departing from the spirit and scope of the invention as set forth in the claims.

That which is claimed:

1. A fitting for a vehicle seat, the fitting comprising:
   first and second fitting parts mounted so that there can be relative rotation, about an axis, between the first and second fitting parts;
   an eccentric mounted for being rotated about the axis;
   at least two locking elements that are guided by the first fitting part for moving radially outward, with respect to the axis, in response to rotation of the eccentric, so that the locking elements interact with the second fitting part to lock the fitting while the locking elements are positioned radially outwardly; and
   at least one spring arrangement for acting upon the eccentric, wherein
   the spring arrangement includes springs,
   the springs are centrally arranged,
   at least a portion of each of the springs is a spiral,
   the springs are nested one inside the other,
   each of the springs has an inner spring end that acts upon the eccentric for rotating the eccentric about the axis, and
   the springs are arranged so that the inner spring ends are spaced apart from one another around the axis, and so that the inner spring ends symmetrically act upon the eccentric to substantially eliminate any transverse forces being applied to the eccentric by way of the spring arrangement.

2. The fitting as claimed in claim 1, wherein the first fitting part includes a central hole that extends completely through the first fitting part, and the spring arrangement is positioned in the central hole of the first fitting part.

3. The fitting as claimed in claim 1, wherein the spring arrangement is positioned in a plane that is offset axially with respect to the eccentric.

4. The fitting as claimed in claim 1, wherein the springs extend around the axis.

5. The fitting as claimed in claim 1, wherein the springs are two springs that are offset around the axis by 180° with respect to each other.

6. The fitting as claimed in claim 1, wherein each of the springs has an outer spring end that is supported on the first fitting part.

7. The fitting as claimed in claim 1, wherein the inner spring ends are axially protruding end fingers that engage in the eccentric.

8. The fitting as claimed in claim 1, wherein the inner spring ends are hooks that engage around projections protruding from the eccentric.

9. The fitting as claimed in claim 1, in combination with the vehicle seat, wherein:
   the vehicle seat includes a seat part and a backrest; and the backrest is attached to the seat part by way of at least the fitting so that the backrest can be pivoted relative to the seat part and can be locked at different inclinations with respect to the seat part.

10. The fitting as claimed in claim 2, wherein the spring arrangement is positioned in a plane that is axially offset with respect to the eccentric.

11. The fitting as claimed in claim 2, wherein the springs extend around the axis.

12. The fitting as claimed in claim 3, wherein the springs extend around the axis.

13. The fitting as claimed in claim 2, wherein the springs are two springs that are offset around the axis by 180° with respect to each other.

14. The fitting as claimed in claim 3, wherein the springs are two springs that are offset around the axis by 180° with respect to each other.

15. The fitting as claimed in claim 4, wherein the springs are two springs that are offset around the axis by 180° with respect to each other.

16. The fitting as claimed in claim 2, wherein:
the first fitting part includes indentations;
each of the indentations extends outwardly from the first fitting part's central hole;
the indentations are spaced apart from one another around the axis;
each of the springs has an outer spring end that engages upon the first fitting part;
the outer spring ends are spaced apart from one another around the axis;
the outer spring ends are respectively positioned in the first fitting part's indentations that are spaced apart from one another around the axis,
the eccentric includes
a central hole, and
engagement features that extend outwardly from the central hole of the eccentric;
the eccentric's engagement features are spaced apart from one another around the axis;
the inner spring ends are respectively engaged to the eccentric's engagement features;
the inner spring ends are spaced apart from one another around the axis by 180°;
at least a portion of each of the springs is a spiral;
the spiral portions of the springs are positioned in the central hole of the first fitting part;
the springs comprise a first spring and a second spring; and
the spiral portions of the springs are nested one inside the other, so that
the spiral portion of the first spring extends completely around a portion of the second spring, and
the spiral portion of the second spring extends completely around a portion of the first spring.

17. A fitting for a vehicle seat, the fitting comprising:
first and second fitting parts mounted so that there can be relative rotation, about an axis, between the first and second fitting parts;
an eccentric mounted for being rotated about the axis;
at least two locking elements that are guided by the first fitting part for moving radially outward, with respect to the axis, in response to rotation of the eccentric, so that the locking elements interact with the second fitting part to lock the fitting while the locking elements are positioned radially outwardly; and
a single spring arrangement for rotating the eccentric, wherein
the spring arrangement consists essentially of two springs,
the two springs are centrally arranged,
at least a portion of each of the two springs is a spiral,
the two springs are nested one inside the others,
each of the two springs has an inner spring end that acts upon the eccentric for rotating the eccentric about the axis, and
the two springs are arranged so that the inner spring ends are spaced apart from one another around the axis by 180°, and so that the inner spring ends symmetrically act upon the eccentric to substantially eliminate any transverse forces being applied to the eccentric by way of the spring arrangement.

18. The fitting as claimed in claim 17, wherein:
the first fitting part includes a central hole that extends completely through the first fitting part;
the spring arrangement is positioned in the central hole of the first fitting part;
the spring arrangement is positioned in a plane that is offset axially with respect to the eccentric;
the spiral portion of each of the springs extends around the axis through more than 360 degrees; and
each of the two springs has an outer spring end that is supported on the first fitting part.

19. A fitting for a vehicle seat, the fitting comprising:
first and second fitting parts mounted so that there can be relative rotation, about an axis, between the first and second fitting parts, wherein the first fitting part includes a central hole that extends completely through the first fitting part, and the central hole includes outwardly extending indentations that are spaced apart from one another around the axis;
an eccentric mounted for being rotated about the axis;
at least two locking elements that are guided by the first fitting part for moving radially outward, with respect to the axis, in response to rotation of the eccentric, so that the locking elements interact with the second fitting part to lock the fitting while the locking elements are positioned radially outwardly; and
at least one spring arrangement for acting upon the eccentric, wherein
the spring arrangement includes springs,
the springs are centrally arranged,
each of the springs has an outer spring end that engages upon the first fitting part,
the outer spring ends are spaced apart from one another around the axis,
the outer spring ends are respectively positioned in the central hole's indentations that are spaced apart from one another around the axis,
at least a portion of each of the springs is a spiral,
the spiral portions of the springs are positioned in the central hole of the first fitting part,
the spiral portions of the springs are nested one inside the other,
each of the springs has an inner spring end that engages upon and thereby acts upon the eccentric for rotating the eccentric about the axis, and
the springs are arranged so that the inner spring ends are spaced apart from one another around the axis by 180°, and so that the inner spring ends symmetrically engage upon and thereby act upon the eccentric to substantially eliminate any transverse forces being applied to the eccentric by way of the spring arrangement.

20. The fitting as claimed in claim 19, wherein:
the eccentric includes
a central hole, and engagement features that extend outwardly from the central hole of the eccentric;

the eccentric's engagement features are spaced apart from one another around the axis; and the inner spring ends are respectively engaged to eccentric's engagement features.

21. The fitting as claimed in claim 19, wherein:

the springs comprise a first spring and a second spring, the spiral portion of the first spring extends completely around a portion of the second spring, and the spiral portion of the second spring extends completely around a portion of the first spring.

22. The fitting as claimed in claim 19, wherein:

the spiral portion of each of the springs includes a first coil and a second coil, the springs comprise a first spring and a second spring, the second coil of the first spring lies between the first and second coils of the second spring, and the second coil of the second spring lies between the first and second coils of the first spring.

* * * * *